(12) United States Patent
Strecker et al.

(10) Patent No.: US 8,788,147 B2
(45) Date of Patent: Jul. 22, 2014

(54) METHOD FOR DETERMINING A TOOTHED RACK FORCE FOR A STEERING DEVICE IN A VEHICLE

(75) Inventors: Joerg Strecker, Pluederhausen (DE); Thomas Werner, Rainau (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 217 days.

(21) Appl. No.: 13/317,281

(22) Filed: Oct. 13, 2011

(65) Prior Publication Data
US 2012/0046836 A1 Feb. 23, 2012

(30) Foreign Application Priority Data
Jul. 6, 2010 (DE) .......................... 10 2010 030 986

(51) Int. Cl.
B62D 6/00 (2006.01)
(52) U.S. Cl.
USPC ............... 701/41; 701/42; 180/400; 180/443; 180/446; 180/447
(58) Field of Classification Search
None
See application file for complete search history.

(56) References Cited

U.S. PATENT DOCUMENTS

| 5,504,403 | A | * | 4/1996 | McLaughlin | 318/432 |
| 5,845,222 | A | * | 12/1998 | Yamamoto et al. | 701/41 |
| 6,122,579 | A | * | 9/2000 | Collier-Hallman et al. | 701/41 |
| 6,152,254 | A | * | 11/2000 | Phillips | 180/422 |
| 6,422,335 | B1 | * | 7/2002 | Miller | 180/446 |
| 7,092,805 | B2 | * | 8/2006 | Kasahara et al. | 701/41 |
| 7,433,768 | B2 | * | 10/2008 | Bernzen et al. | 701/41 |
| 2002/0129988 | A1 | * | 9/2002 | Stout et al. | 180/400 |
| 2003/0144780 | A1 | * | 7/2003 | Recker et al. | 701/41 |
| 2004/0238238 | A1 | * | 12/2004 | Yokote | 180/6.2 |
| 2006/0047391 | A1 | * | 3/2006 | Katou | 701/41 |
| 2006/0070794 | A1 | * | 4/2006 | Fujita et al. | 180/446 |
| 2006/0081410 | A1 | * | 4/2006 | Phillips | 180/421 |
| 2006/0086087 | A1 | * | 4/2006 | Phillips | 60/384 |
| 2006/0086560 | A1 | * | 4/2006 | Furusho et al. | 180/446 |
| 2007/0017735 | A1 | * | 1/2007 | Kataoka et al. | 180/446 |
| 2008/0264711 | A1 | * | 10/2008 | Phillips | 180/422 |
| 2008/0275608 | A1 | * | 11/2008 | Campo et al. | 701/41 |
| 2009/0024281 | A1 | * | 1/2009 | Hwang | 701/42 |
| 2009/0078494 | A1 | * | 3/2009 | Dornhege et al. | 180/446 |
| 2009/0112406 | A1 | * | 4/2009 | Fujii et al. | 701/42 |
| 2010/0152952 | A1 | * | 6/2010 | Lee et al. | 701/29 |
| 2010/0204889 | A1 | * | 8/2010 | Watanabe et al. | 701/42 |
| 2010/0211264 | A1 | * | 8/2010 | Wey et al. | 701/41 |
| 2010/0228441 | A1 | * | 9/2010 | Watanabe et al. | 701/41 |
| 2011/0184608 | A1 | * | 7/2011 | Benyo et al. | 701/41 |

FOREIGN PATENT DOCUMENTS

DE 103 32 023 2/2004

* cited by examiner

*Primary Examiner* — Jonathan M Dager
(74) *Attorney, Agent, or Firm* — Jordan and Hamburg LLP

(57) ABSTRACT

Disclosed is a method for determining a toothed rack force on a steering device in a vehicle, wherein the toothed rack force (forZS) is determined as a function of a plurality of models, and wherein a component (forESM) of the toothed rack force (forZS) which relates to a driving process is generated by means of a first model, and a component of the toothed rack force (forZS) which relates to a parking process is generated by means of a second model.

2 Claims, 3 Drawing Sheets

METHOD FOR DETERMINING A TOOTHED RACK FORCE FOR A STEERING DEVICE IN A VEHICLE

BACKGROUND OF THE INVENTION

The invention relates to a method for determining a toothed rack force for a steering device in a vehicle.

The invention also relates to a steering device in the vehicle. The invention further relates to a control unit for a steering device in a vehicle and to a computer program that can be executed on the control unit.

In modern steering devices, for example in an electric power steering (EPS) system or in what is referred to as a Steer-by-Wire (SbW) steering system, a target steering torque is determined, which is applied to a steering means, for example a steering wheel, in order to support or counteract the force applied by the driver.

EPS steering systems that are currently employed generate an EPS motor torque based on a toothed rack force that is present, so as to provide the driver with the appropriate steering assistance. The toothed rack force is decisively influenced by the current cornering forces. A significant part of the current toothed rack force thus corresponds to transverse acceleration. The toothed rack force, however, is determined not only by lateral forces that occur when traveling in a curve, but rather a variety of other variables of a current driving situation also influence the toothed rack force. One example of this is the roadway condition (unevenness, lane grooves, or the friction coefficient).

Additionally, further functions may be involved in generating the target steering torque so as to achieve a desired and pleasant steering feel for the driver, wherein, on the one hand, undesirable disturbances should not have any influence on the target steering torque, but, on the other hand, safety-relevant information in particular, such as on the current conditions of the roadway surface, should be brought to the attention of the driver via the steering torque.

Compared to hydraulic steering systems, however, such EPS steering systems have disadvantages in terms of the feedback regarding the driving conditions. Given the relatively high inertia of the EPS actuator, in known EPS steering systems, it is of particular note that the behavior at various road friction coefficients or within the physical handling limitations, such as during understeering or oversteering, is only conditionally passed on to the driver via the perceivable steering torque.

It is known to determine the currently present toothed rack force by means of a torque sensor that is disposed on the toothed rack, or by estimation using what is referred to as an observer, which is based on a model of the steering system. Such a method is known, for example, from DE 10332023 A1. There, according to a first exemplary embodiment, the steering torque is determined as a function of the lateral force occurring on the steered wheels, and according to a further exemplary embodiment, it is determined as a function of the actual steering torque, so as to determine a steering torque for steering a vehicle. According to the known method, the lateral force is estimated or modeled by means of a sensor, or is based on a model of the steering system of the vehicle, depending on at least one of the variables of transverse acceleration, steering angle and vehicle speed.

The toothed rack force determined by means of the known methods provides the force conditions actually present at the front axle of the vehicle, or at the toothed rack, depending on the quality of the method. If this force is used as a basis for generating what is referred to as a desired steering torque, the driver obtains good feedback on the behavior of the vehicle, or on the conditions of the roadway.

Generating a driver's desired steering torque based on the toothed rack force that is present includes, not only the level that is actually required, but also various disturbances having different characteristics. These are dependent, for example, on the design of the axle(s) and/or the general configuration of the vehicle. Disturbances, here, can be understood to mean a variety of roadway factors such as unevenness, lane grooves or lateral inclination. Additional disturbances can develop as a result of longitudinal dynamics events at the steered front axle. Examples of this include varying lengths of drive shafts in front-wheel drive vehicles, active drive components such as all-wheel drive, or components for variably distributing a driving torque to the front wheels. Another influencing factor that may be perceived as a disturbance can result from the load of the vehicle and, in general, notably resulting from the front axle load. Put in simplified terms, it can be stated that the toothed rack force acting on the steering system increases as the load on the front axle rises. The tires on the wheels additionally influence the toothed rack force or the target steering torque.

It is the object of the present invention to generate a toothed rack force for steering devices in vehicles comprising electric power steering (EPS), which both represents a particularly good basis for generating a driver's desired torque, and is free of disturbances to as great an extent as possible.

SUMMARY OF THE INVENTION

The object is achieved by a method of the type mentioned above, by determining the toothed rack force as a function of a plurality of models, wherein a component of the toothed rack force which relates to a driving process is generated by means of a first model, and a component of the toothed rack force which relates to a parking process is generated by means of a second model.

The object is also achieved by a steering device in a vehicle, in that the steering device comprises means for carrying out the method according to the invention. These means are implemented, for example, in the form of a computer program that is executed by the control unit. The control unit is also referred to hereinafter as a "controller".

Advantageous refinements of the invention are provided in dependent claims, wherein the characteristics can be important for the invention both alone and in various combinations, without further explicit reference being made thereto.

The invention has the advantage that information, which is reliable to as great an extent as possible, on the behavior of the vehicle or the conditions of the roadway can be transmitted to the driver of the vehicle at all times, even with varying driving situations or operating conditions, by finding the toothed rack force that is employed for generating the driver's desired steering torque as a function of models that have been optimized for the respective driving situation, wherein the toothed rack force is, or individual components of the toothed rack force are, generated by means of the models, as a function of the current driving situation.

According to the invention, the toothed rack force that is used for the target steering torque to be generated is replaced by a toothed rack force that is modeled using a plurality of models. This is done such that the modeled toothed rack force can be compared to the actual toothed rack force for multiple driving situations and operating states.

Pursuant to the method according to the invention, the modeled toothed rack force and the actual toothed rack force can additionally be weighted as a function of a driving situation and/or operating variables of the vehicle and can be combined to form a resulting toothed rack force, by means of which the target steering torque can be determined. It is thus possible to adapt the modeled toothed rack force to the actual toothed rack force, so that the modeled toothed rack force according to the invention always corresponds to the actual toothed rack force with sufficient accuracy, for example when the friction coefficient changes, whereby optimal feedback can be provided to the driver at all times, without the disturbances present in the actual toothed rack force negatively influencing the driver's desired torque. This offers an advantage is so much as the modeled toothed rack force according to the invention can be optimally found within a very wide range of possible driving situations. The actual toothed rack force used for the adaptation can be determined by means of a sensor, or alternatively from other variables that characterize the steering device, or the forces acting thereon, and/or actuators.

Preferably, at least one of the following variables is used to generate the modeled toothed rack force:
  a steering wheel angle of the steering means;
  a wheel steering angle;
  a slip angle;
  a vehicle speed;
  a transverse vehicle acceleration;
  a yaw velocity of the vehicle;
  a lateral force of a steered axle of the vehicle;
  the actual toothed rack force;
  a variable characterizing oversteering or understeering of the vehicle;
  a position of an actuator; and/or
  a rotational speed, a torque, or a currently engaged gear.

It is thus possible to include the operation of the vehicle and the respective driving situation in the determination of the modeled toothed rack force according to the invention. These variables can be subjected to mathematical operations either individually or in any arbitrary combination and contribute to the modeled toothed rack force. The modeled toothed rack force can thereby be adapted particularly well to an actual toothed rack force.

According to one embodiment of the method, the modeled toothed rack force and the actual toothed rack force are weighted and combined using a PI controller. This can be done with the aid of what is referred to as feed-forward and is, preferably, carried out so that the resulting toothed rack force has a defined and steady temporal course.

According to one embodiment of the method, the toothed rack force is determined by way of the following components:
  a model for describing a driving process of the vehicle; and
  a model for describing a parking process of the vehicle.
  Preferably, the following components are also used:
  a model for describing the hysteresis properties of an axle of the vehicle, wherein this model may also correspond to the model for describing the parking process;
  a model for describing at least one force that is generated by raising the vehicle as a function of a wheel steering angle and that acts on a toothed rack; and/or
  an adaptation block for weighting and combining the modeled toothed rack force and the actual toothed rack force.

A first model comprises variables for describing a vehicle driving process. A first contribution to the modeled toothed rack force is substantially determined from a wheel steering angle and a vehicle speed. An additional basis forms what is referred to as a single-track model, wherein lateral tire forces are determined as a function of a slip angle of a wheel, using a non-linear relationship. This generates a nominal model, which is subsequently adjusted by modifying lateral forces of the front and rear wheels as a function of the current driving situation—for example, based on a changing friction coefficient of the roadway or the wheels.

The lateral forces are determined using a current transverse vehicle acceleration and a yaw rate or a yaw acceleration. The adaptation is made, for example, using a PI controller having a feed-forward component, this feed-forward component being a model force that is determined by way of the single-track model. A target variable for the PI controller is, for example, a variable mean value composed of the model force—which is to say the lateral force modeled according to the single-track model—and an actual lateral force. The mean value can be found depending on several variables, such as the slip angle. The determination of the mean value can be designed, for example, so that the model force is approximately 100 percent decisive for a normal driving situation. As the slip angle increases, the component of the actual lateral force is increased and, accordingly, the component of the model force is reduced. For example, at a slip angle of 10°, a mean value at which each component is 50% may be suitable. It is thus advantageously possible to take a reduced friction coefficient into consideration, which results from the respective roadway properties and tire properties.

The lateral force of the front axle thus adapted can be used to determine the modeled toothed rack force. The adapted lateral force can be multiplied by the so-called virtual castor so as to determine a self-alignment torque. The virtual castor is characterized by a non-linear characteristic line depending on the slip angle of the front axle and is parameterized in accordance with a nominal result. The self-alignment torque determined in this way is geared to the toothed rack at the design-based axle ratio. To this end, the design-based axle ratio shall be understood to mean the gearing relationship between the toothed rack travel and the wheel steering angle. The modeled toothed rack force determined in consideration of the aforementioned variables, or operations, can subsequently be multiplied with a factor that is dependent on the vehicle speed.

A second model comprises variables for describing a vehicle parking process. This process differs significantly from normal driving situations and can, advantageously, be taken into consideration by way of the second model. The second model is activated as the vehicle speed decreases and, accordingly, is deactivated as the vehicle speed increases, wherein the activation and deactivation can be carried out by steadily increasing, or decreasing, the contribution of this component to the modeled toothed rack force. The parking process can, consequently, be determined particularly easily based on the current speed.

The second model generates a component for the modeled toothed rack force essentially from the steering angle, or wheel steering angle, and a steering speed, which can generally be represented by what is known as a drilling model of the tires. A first force component is generated by a non-linear stiffness depending on the wheel steering angle. A second force component is generated as a damping force depending on the steering speed. A third force component is generated by way of a hysteresis force model. The three force components are added, and characterize essential forces that affect steering during a parking process, which can further be adapted to an existing design of the vehicle.

A third model describes the properties of an axle of the vehicle, and notably what are referred to as the hysteresis properties. Additional variables resulting from the design of the vehicle, or from the current driving situation, can thus be taken into consideration. For example, it is possible to include force components resulting from rubber axle bearings, whereby the modeling can become more precise. The third model can notably take a steering speed and a current total modeled toothed rack force into consideration. The hysteresis properties can also be found by way of the component describing the parking process, and conversely. The hysteresis properties can notably be considered only, or predominantly only, during parking. In this case, this third model would consequently correspond to the second model, or replace the same.

A fourth model describes at least one force, which is generated by raising the vehicle as a function of the wheel angle, and which acts on the toothed rack. This can further improve the modeling process. Depending on the axle construction, the front axle of the vehicle is raised due to the steering process, notably with larger steering angles. This results in a component of the toothed rack force in accordance with a respective steering angle, notably during parking. It is therefore expedient to increase, or reduce, this force component depending on the vehicle speed. This component can thus also be used to generate the force component to be considered during the parking process.

According to a particularly advantageous embodiment, the force component to be considered during the parking process is determined by way of the third model and the fourth model, because hysteresis and the raising of the vehicle play particularly important roles during parking. In this case, the second model could thus be implemented by combining the third and fourth models.

The adaptation block offsets the modeled toothed rack force generated by way of the four aforementioned model components against the actual toothed rack force, using additional variables. The calculation is preferably done using a PI controller and what is referred to as feeding forward. The additional variables may comprise the slip angle, variables for describing a driving condition with respect to possible oversteering or understeering, the vehicle speed, and variables for describing actuator activities and/or drive components.

According to a further embodiment of the method, the models, or the variables generated therewith, are individually added, removed and/or continuously evaluated with a factor. This is possible, in principle, for each of the models. Notably, the models or variables that are used for normal driving situations and parking processes can be continuously incorporated or suppressed. This is preferably done in such a way that a transition is not perceived by the driver.

Modeling can be further improved by adapting the lateral force that acts on the axle of the vehicle, using a modeled lateral force that is found pursuant to a single-track model, an additional lateral force component, and a slip angle. This can be done, for example, by way of various mathematical operations, using non-linearities, and/or by way of controls. The accuracy of the method can thus be improved. It is proposed, in particular, to determine the additional lateral force component using the transverse vehicle acceleration, the yaw velocity and/or yaw acceleration.

The adaptation of the lateral force can be improved when this is done using a PI controller. Steady behavior of the adapted lateral force can thus be advantageously achieved.

Additional characteristics, possible applications and advantages of the invention will be apparent from the following description of exemplary embodiments of the invention, which will be described based on the drawings, wherein the characteristics can be important for the invention both alone and in various combinations, without further explicit reference being made thereto.

DESCRIPTION OF THE PREFERRED EMBODIMENTS

The control unit is also referred to as hereinafter as a "controller".

Figure 1:
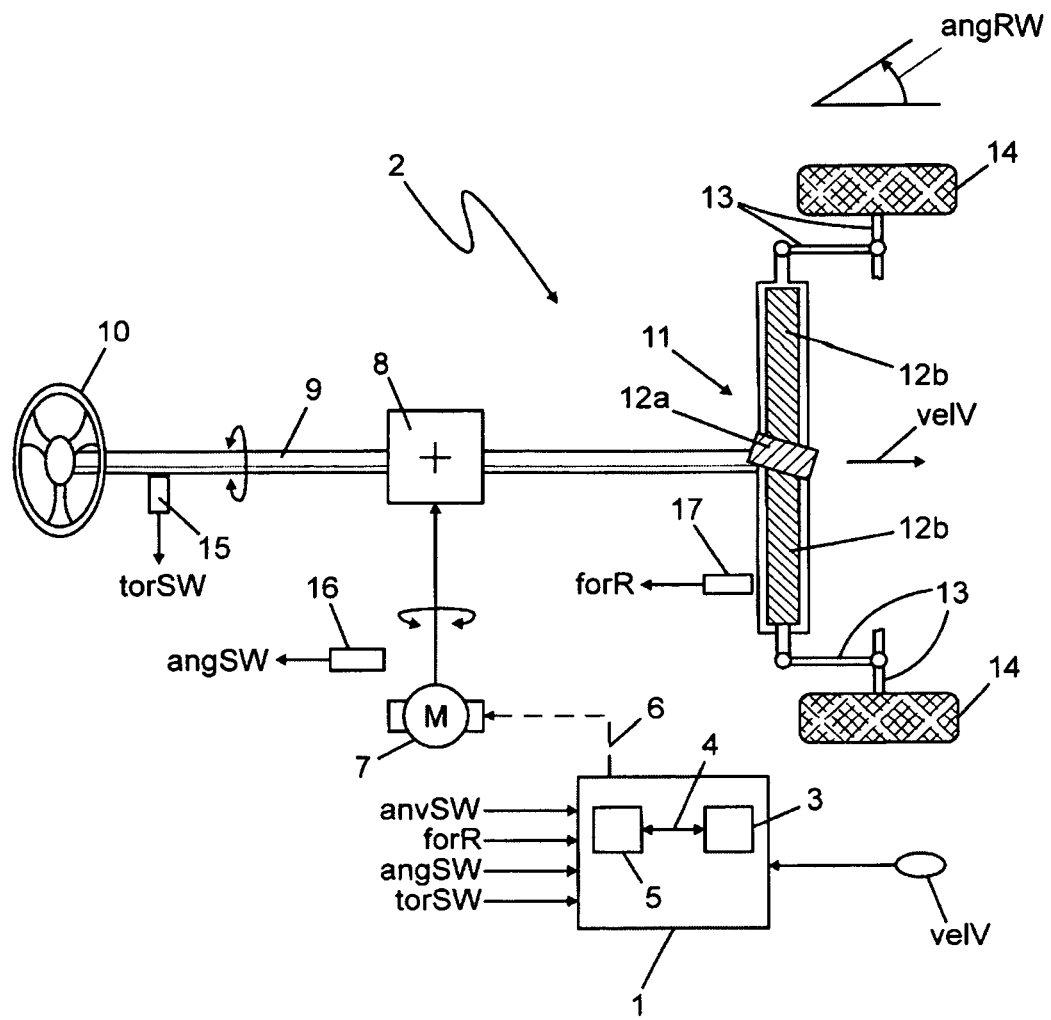
FIG. 1 is a steering device comprising a control unit for carrying out the method according to the invention.

FIG. 1 shows a controller 1, which is associated with a steering device 2. A microprocessor 3 is disposed in the controller 1 and is connected via a data line 4, such as a bus system, to a memory medium 5. The controller 1 is connected, via a signal line 6, to a motor 7, such as an electric motor, allowing for control of the power of the motor 7 by the controller 1. The motor 7 acts on a torsion bar 9 via a transmission 8. A steering means 10, which in the present example is designed as a steering wheel, is disposed on the torsion bar 9 and can be used to apply a torque to the torsion bar 9 as a result of a driver actuating the steering means 10.

The steering device 2 moreover comprises a steering gear 11, which is designed, for example, as a rack-and-pinion steering gear. The steering gear 11 can further be designed as a ball-and-nut gear or recirculating-ball gear. The description hereafter primarily assumes a rack-and-pinion steering gear—to the extent necessary—in which the steering gear 11 comprises a pinion 12a and a toothed rack 12b. The steering gear 11 is connected to the wheels 14, for example, by way of the pinion 12a and the toothed rack 12b and by a steering linkage 13. The wheels 14 can have a wheel steering angle angRW in relation to a central position, which corresponds to the vehicle driving straight ahead. The drawing of FIG. 1 further shows a vehicle speed velV.

The steering device 2 further comprises a torque sensor 15 for detecting an actual steering torque torSW and a sensor 16 for detecting a steering wheel angle angSW. In the exemplary embodiment shown in FIG. 1, the sensor 16 is associated with the motor 7, so that the sensor 16 detects a rotor angle of the motor 7. This angle corresponds to the steering wheel angle angSW (potentially with the exception of a factor that denotes a gear ratio) because the motor 7 cooperates with the torsion bar 9, and thus with the steering means 10, via the transmission 8. The steering wheel angle angSW can also be detected by means of a sensor that is associated with the steering means 10 or the torsion bar 9. The sensor 16 disposed on the motor 7, however, can achieve a higher resolution by detecting the rotor angle.

The steering device 2 further comprises a sensor 17, which can be used to determine an actual toothed rack force forR. The actual toothed rack force forR corresponds to a transverse acceleration or to an actual cornering force acting on the toothed rack 12b by way of the wheels 14 and the steering linkage 13. The actual toothed rack force forR is transmitted to the controller 1. As an alternative to the sensor 17, the actual toothed rack force forR can also be determined by means of an observer, wherein variables are used that directly relate to the steering device 2, such as a motor torque of the motor 7 and the actual steering torque torSW detected by the torque sensor 15. In addition, dynamic variables can be used to make the determination of the actual toothed rack force more precise.

As an alternative, or in addition to the actual toothed rack force forR acting on the wheels 14, according to the invention a modeled toothed rack force forMD is used, either entirely or partially. The modeled toothed rack force forMD is likewise determined by means of the controller 1.

The actual steering torque torSW detected by means of the torque sensor 15 and the steering wheel angle angSW detected by means of the sensor 16 are likewise transmitted to the controller 1. Moreover, the current vehicle speed velV is transmitted to the controller 1 or is calculated there based on other variables. A steering speed anvSW is also supplied to the controller 1. The steering speed anvSW denotes the rotational speed by which the steering means 10, and thus the torsion bar 9, are actuated. The steering speed anvSW can be captured by means of a suitable sensor, for example at the torsion bar 9. It is also possible for the steering speed anvSW to be found in the controller 1, for example as a function of the existing steering wheel angle angSW and the time.

Figure 2:
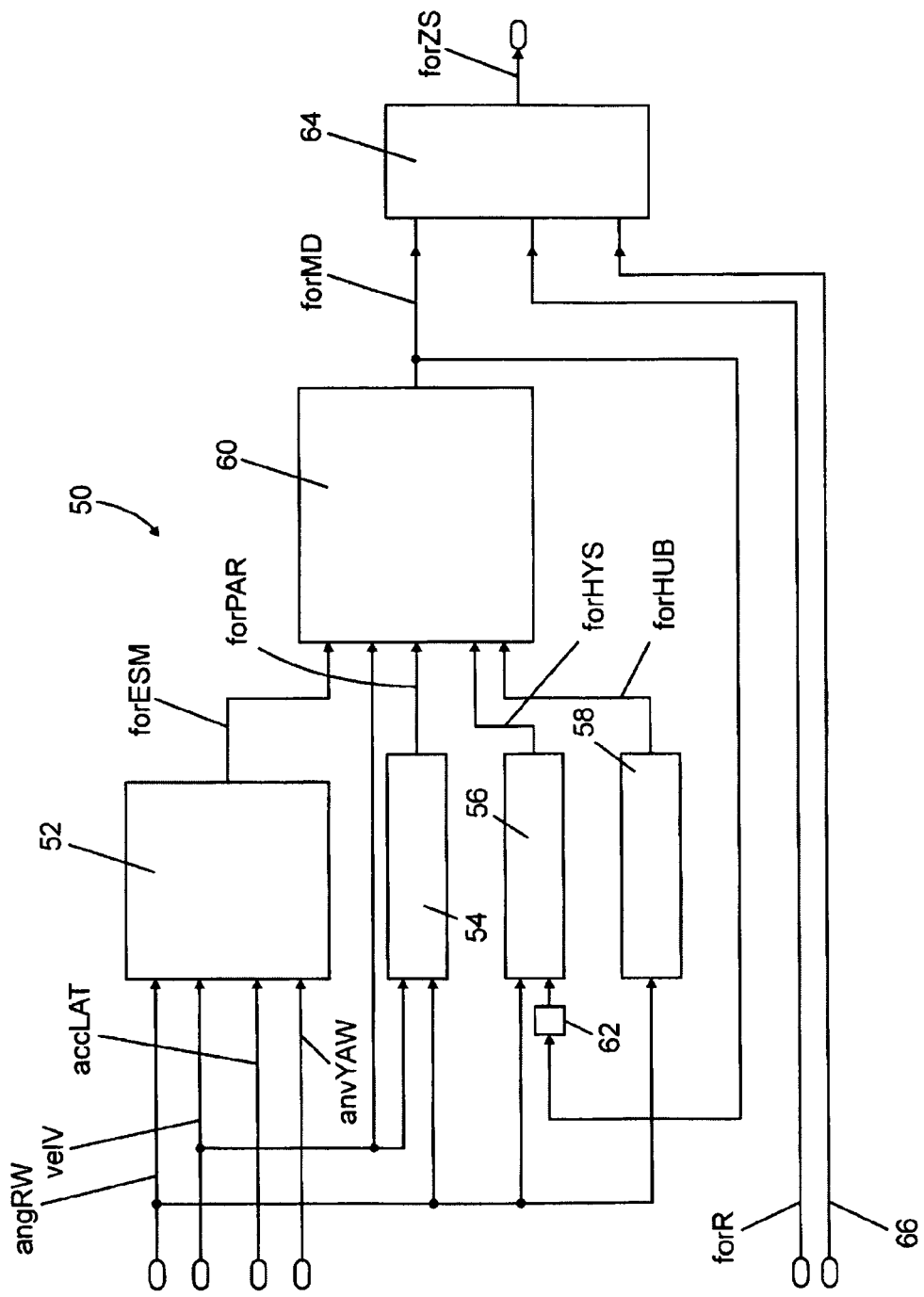
FIG. 2 is a block diagram of an embodiment according to the invention for calculating the toothed rack force.

The operating principle of the method for determining the toothed rack force forZS, which is executed in the controller 1, is shown based on the diagram in FIG. 2. The method is preferably realized in the form of a computer program, in which the functionalities required for determining the modeled toothed rack force forMD are suitably implemented. The computer program is stored, for example, in the memory medium 5 and is executed on the microprocessor 3.

In an exemplary embodiment, FIG. 2 shows a block diagram for determining a resulting toothed rack force forZS, the diagram essentially consisting of several models. In the left region of the drawing of FIG. 2, the four blocks denote the following, from top to bottom:
- a model 52 for describing a driving process of a vehicle;
- a model 54 for describing a parking process of the vehicle;
- a model 56 for describing hysteresis properties of a vehicle axle; and
- a model 58 for describing a force that is generated by raising the vehicle as a function of the wheel steering angle and that acts on the steering.

A block 60 in the central region of the drawing of FIG. 2 combines output signals from the models 52, 54, 56 and 58 and, based thereon, determines the modeled toothed rack force forMD. The modeled toothed rack force forMD is determined depending on the variables that are used in FIG. 2 and in accordance with the shown signal paths.

In the embodiment shown by way of example in FIG. 2, the modeled toothed rack force forMD is fed back to the model 56 via a delay block 62 so as to determine the hysteresis properties.

The input variables of a downstream adaptation block 64 include the modeled toothed rack force forMD that is present at the output of the block 60, the actual toothed rack force forR, and additional variables denoted by reference numeral 66, which comprise a slip angle angSID, for example.

FIG. 2 shows the following input variables:
- a wheel steering angle angRW [rad, radian];
- a vehicle speed velV [km/h, kilometers per hour];
- a transverse acceleration accLAT [m/s^2, meters per second squared]; and
- a yaw velocity anvYAW [rad/s, radian per second].

The four input variables are fed to the blocks 52, 54, 56, 58, and 60, as is shown by lines and arrows in FIG. 2.

The model 52 uses the input variables in order to determine a component forESM of the modeled toothed rack force forMD for a normal driving process of the vehicle and supplies the component forESM to the block 60. The component forESM is substantially determined from the wheel steering angle angRW and the vehicle speed velV. The basis for this forms the single-track model known from the prior art, wherein lateral forces of the tires, or of the associated axle, are determined as a function of a slip angle of the wheels 14. In the present example, this is referred to as a nominal model. Based thereon, the nominal model is adapted by taking the influencing factors, which are dependent on the current driving situation, of the front and rear lateral forces acting on the wheels into consideration. The lateral forces can thus be adjusted accordingly, which is to say they can be adapted. This will be described in more detail below based on FIG. 3.

The model 54 uses the vehicle speed velV and the wheel steering angle angRW in order to determine a component forPAR for a parking process of the vehicle and likewise supplies the component forPAR to the block 60.

The model 56 shown by way of example in the embodiment of FIG. 2 uses the wheel steering angle angRW and the fed-back modeled toothed rack force forMD in order to determine a component forHYS for describing hysteresis properties of one or more vehicle axles and likewise supplies the component forHYS thus determined to the block 60.

The model 58 uses the wheel steering angle angRW in order to determine or describe a force forHUB, which develops as a result of raising the vehicle as a function of the wheel steering angle angRW. For this purpose, design-related properties of the vehicle can also be taken into consideration.

In the block 60, a modeled toothed rack force is formed from the individual models 52, 54, 56, and 58. For this purpose, one or more of the models, or the variables formed therewith, can be continuously activated (incorporated) and/or continuously deactivated (suppressed), or added or removed, for example as a function of a driving situation.

In the block 64, the modeled toothed rack force forMD generated in the block 60 is calculated against the actual toothed rack force forR, using additional variables 66. In the present example, the additional variables 66 comprise a slip angle angSID, variables for describing a driving condition with respect to possible oversteering or understeering, the vehicle speed velV, and variables for describing actuator activities and/or drive components. The basic inner structure of the block 64 is similar to the block diagram described hereafter by way of FIG. 3, however different input variables are used. The adaptation block 64 notably utilizes a PI controller that is similar to FIG. 3 and has a feed-forward component.

Figure 3:
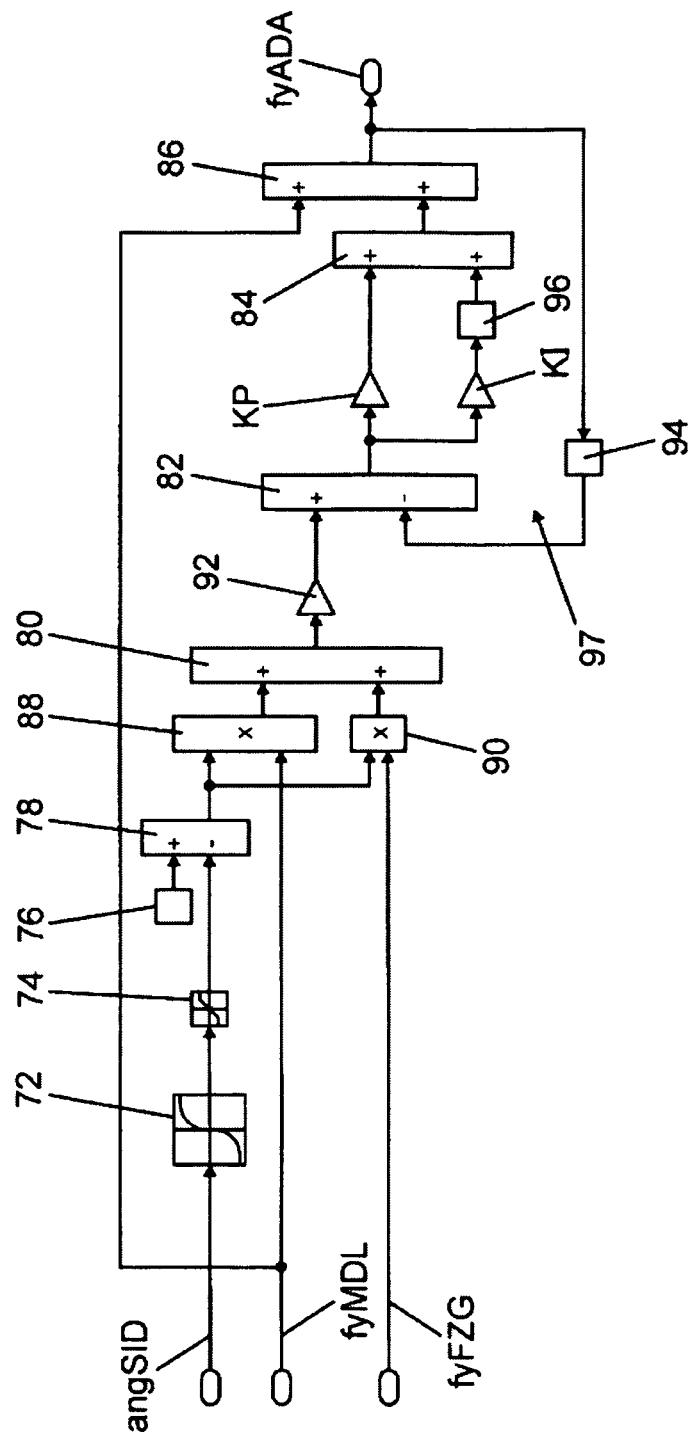
FIG. 3 is a block diagram, supplementing FIG. 2, for adapting a lateral force.

FIG. 3 shows a block diagram for determining an adapted lateral force fyADA acting on the front axle. FIG. 3 shows the following input variables:
- a slip angle angSID;
- a modeled lateral force fyMDL, which characterizes a lateral force of a vehicle axle or of the wheel 14, and which is determined based on a single-track model according to the prior art; and
- an actual lateral force fyFZG of the vehicle axle or of the wheel 14, which is determined as a function of the transverse vehicle acceleration accLAT and the yaw velocity anvYAW or a yaw acceleration of the vehicle.

The embodiment 10 shown based on the block diagram of FIG. 3 comprises, amongst others, the following functional blocks:
- non-linear scaling 72 of the slip angle angSID and a downstream limiter 74;
- a constant 76, which in the present example has a value of "100", and a first adder 78;
- a second, third, fourth and fifth adder 80, 82, 84, and 86;
- a first multiplier 88 and a second multiplier 90;
- three factors 92, KP and KI;
- a run time 94;
- an arithmetic block 96, which in the present example performs a function in accordance with a term $$\frac{K \cdot Ts}{z-1}.$$

The factor KP denotes a proportional component, the factor KI denotes an integral component, and the block 96 denotes an integrator of a control loop 97 represented by the blocks 82, 84, 86, 94, 96, KP and KI.

It is apparent that the adapted lateral force fyADA is found from the three input variables by means of various arithmetic operations. Amongst others, the slip angle angSID is found and delimited in a non-linear manner, wherein the signal thus found suitably weights the modeled lateral force fyMDL and the actual lateral force fyFZG by way of the multipliers 88 and 90. The output signal of the adder 80 subsequently runs through the control loop 97. Thereafter, the modeled lateral force fyMDL is additionally forwarded to the adder 86 as a so-called feed-forwarded component, from which the adapted lateral force fyADA is found as an output variable of the block circuit shown in FIG. 3.

Overall, the block diagram of FIG. 3 shows the adaptation of the component forESM of the toothed rack force which is used for the driving process. In simplified terms, the modeled lateral force fyMDL and the actual lateral force fyFZG are calculated against each other in the block circuit of FIG. 3. For this purpose, amongst others, the slip angle angSID, the actual lateral force fyFZG, the vehicle speed velV, the driving situation, such as oversteering or understeering, and/or drive components, such as actuators disposed on the steering device, can be taken into consideration. This will be described in more detail below.

In order to adapt the modeled lateral force fyMDL, the lateral forces that are present at the wheels 14 are initially calculated. The calculation is carried out using the vehicle speed velV, or a vehicle acceleration, and the yaw velocity anvYAW, or the yaw acceleration. The adaptation as such is carried out by means of a PI controller that is formed by the control loop 97 and has a feed-forward component. The modeled lateral force fyMDL acts as the feed-forward component. The target variable for the PI controller is a variable mean value of the modeled lateral force fyMDL and of the determined actual lateral force fyFZG. The mean value can be found as a function of certain signals, for example the slip angle angSID, as is shown in FIG. 3. The mean value is preferably found so that during normal driving situations—which is to say at a comparatively small slip angle angSID—the modeled lateral force fyMDL can contribute as much as 100 percent, and accordingly the actual lateral force fyFZG can contribute as little as 0 percent, in the adapted lateral force fyADA. As the slip angle angSID increases, the mean value can be accordingly adjusted, so that, for example at a slip angle angSID of 10°, both the modeled lateral force fyMDL and the adapted lateral force fyADA each constitute a component of 50 percent. In this way, for example, it is also possible to take into consideration a coefficient of the friction of the wheels on the roadway, which has changed as compared to a normal driving situation, so as to suitably adapt the aforementioned nominal model.

The adapted lateral force fyADA of the front axle is used to calculate the modeled toothed rack force forMD. By multiplication with what is referred to as the virtual castor, a self-alignment torque can be calculated. The castor is described by a non-linear characteristic line as a function of the slip angle of the front axle and is parameterized depending on a nominal result. The tire aligning torque thus obtained is geared to the toothed rack 12b at the design-based axle ratio. The design-based axle ratio describes the gearing relationship between a travel of the toothed rack 12b (toothed rack travel) and the wheel steering angle angRW. The force on the toothed rack 12b thus determined is multiplied with an additional, speed-dependent factor.

The invention claimed is:

1. A method for determining a toothed rack force representing force conditions at a front axle of a vehicle having a power steering system that includes a steering device and a control unit, the method comprising:
   receiving at the control unit operating variables of the vehicle; and
   determining by the control unit the toothed rack force (forZS) as a function of a plurality of models, wherein a component (forESM) of the toothed rack force (forZS) which relates to a driving process is generated by means of a first model, and a component of the toothed rack force (forZS) which relates to a parking process is generated by means of a second model; and
   using the determined toothed rack force by the control unit in connection with a power steering system operation of the vehicle; and
   wherein an adaptation is carried out as a function of at least one lateral force (fyADA), at least for the component (forESM) relating to a driving process; and
   wherein the lateral force (fyADA) is found as a function of a modeled lateral force (fyMDL) that is found by means of a single-track model, an actual lateral force (fyFZG), and a slip angle (angSID).

2. A method according to claim 1, wherein the actual lateral force (fyFZG) is determined by the control unit using the transverse vehicle acceleration (accLAT), the yaw velocity (anvYAW) and/or a yaw acceleration.

* * * * *